United States Patent [19]

Aoe et al.

[11] Patent Number: 5,479,614
[45] Date of Patent: Dec. 26, 1995

[54] OBJECT SENSOR PROCESSING METHOD AND PROCESSOR

[75] Inventors: Shigeru Aoe, Tokyo; Gen Kakehi; Tadamitsu Ryu, both of Yokohama; Mineo Gamoh, Yuki; Toshiki Watanabe, Kawasaki; Etsuko Isono, Ishibashi, all of Japan

[73] Assignee: Fujitsu Limited, Kawasaki, Japan

[21] Appl. No.: 174,628

[22] Filed: Dec. 28, 1993

Related U.S. Application Data

[63] Continuation of Ser. No. 651,244, Mar. 8, 1991, abandoned.

[30] Foreign Application Priority Data

| Sep. 14, 1989 | [JP] | Japan | 1-239448 |
| Oct. 9, 1989 | [JP] | Japan | 1-263671 |
| Oct. 17, 1989 | [JP] | Japan | 1-270045 |

[51] Int. Cl.⁶ ............................. G06F 15/00
[52] U.S. Cl. .......................... 395/200; 395/700
[58] Field of Search ................. 395/200, 250, 395/600; 364/DIG. 1 MS File, DIG. 2 MS File

[56] References Cited

U.S. PATENT DOCUMENTS

| 4,739,477 | 4/1988 | Barker et al. | 395/600 |
| 5,093,914 | 3/1992 | Coplien et al. | 395/700 |
| 5,093,916 | 3/1992 | Karp et al. | 395/700 |
| 5,125,091 | 6/1992 | Staas, Jr. et al. | 395/650 |
| 5,130,924 | 7/1992 | Barker et al. | 395/700 |
| 5,133,070 | 7/1992 | Barker et al. | 395/650 |
| 5,142,674 | 8/1992 | Barker et al. | 395/800 |
| 5,265,206 | 11/1993 | Shackelford et al. | 395/200 |
| 5,276,816 | 1/1994 | Cavendish et al. | 395/275 |
| 5,339,430 | 8/1994 | Lundin et al. | 395/700 |

FOREIGN PATENT DOCUMENTS

| 445769A2 | 9/1991 | European Pat. Off. . |
| 63-138431 | 6/1988 | Japan . |
| 1169533 | 7/1989 | Japan . |
| 1193940 | 8/1989 | Japan . |

OTHER PUBLICATIONS

Supplementary European Search Report, Appln. No. EP 90 91 3249.
"Object–oriented programming", vol. 12, No. 8, Oct. 1988, 2407 Microprocessors & Microsystems, London, GB.
"Objecktorientierte Programmierung Object–Oriented Programming" by Barth and Welsch, Universitat Stuttgart, Informationstechnik it 30 (1988) 6.

*Primary Examiner*—Robert B. Harrell
*Attorney, Agent, or Firm*—Staas & Halsey

[57] ABSTRACT

In a computer system, a device which takes the real area as the objects (1-1, . . . ) and selects dynamically the real data (11) as the actors (2-1, . . . ) and the method (42) for processing such actors, is provided, objects (1-1 . . . ) are formed by capsulating the instance including real data (11) as the parts and the method (42) and thereby data processing is carried out mainly with the actors (2-2 . . . ), namely the real data. In view of dynamically forming an object (1-2) capsulating the real data (instance) (11) and the method (42), a part called the object sensor which indicates the real data (11) given the meaning by the command is prepared, the command is sent and received in the data processing means by the object modeling the real area, and thereby new type and practical object-oriented data processing just suitable for processing of multi-media data, distributed processing of data base and processing of network system can be realized.

7 Claims, 16 Drawing Sheets

PRIOIR ART

OBJECT SENSOR PROCESSING METHOD AND PROCESSOR

This application is a continuation of application No. 07/651,224, filed Mar. 8, 1991, now abandoned.

FIELD OF THE INVENTION

The present invention relates to a new type object oriented data processing method and processor in a computer system and particularly to an object sensor processing method and processor which prepares a part for an object sensor indicating real data signified by command for dynamically generating a capsulated object consisting of real data (instance) and the method and realizes data processing by modeling real area with object sensor.

BACKGROUND OF THE INVENTION

FIG. 16 indicates the conventional technique for processing data with a computer system.

In general, data is input and a processing result is output after executing some processings of such input data in the computer system.

In FIG. 16, the reference numeral 10 denotes memory; 11-1, 11-2, . . . , real data; 100, various processings or processes. The real data 11-1, . . . indicate real bodies of data depending, for example, character text data, or dot data for image display or vector data for line display, etc.

In the prior art, when various processings 100, such as retrieval, display, edition, transfer or data distribution, etc., is performed for these real data 11-1,11-2, . . . , access is made actually to a memory 10 storing such real data for each processing and thereby respective real data 11-1, 11-2, . . . are processed in direct.

Particularly, input/output data for various input/output devices have important significance from the point of view of utilizing a data processing system. However, the conventional data processing system has processed these data individually. Namely, any particular link is not provided for buffer, file or link for various definition.

For example, when it is necessary to overlappingly display images and character texts and simultaneously output voice data, the conventional system has been required to individually recognize data of different media with the processing programs and to process such data by making access to the related data.

For this reason, the conventional system has following disadvantages.

(1) It is impossible to provide a unified definition to respective real data having different properties and to complete respective real data as the parts by giving abstract meaning to these data.

(2) In case it is required to deal with data uniformly, data size must be constant field size and if only small amounts of data exist for each field , memory is used insufficiently.

(3) It is difficult to deal, from the one meaning, with various multi-media data such as code data, dot data, voice data and image data.

(4) Processing speed is lowered during the processing by for example transfer of unwanted real data.

(5) When decentralized data base is desired, management is complicated and communication cost increases.

By the way, a so-called objected oriented architecture is known for giving abstract meaning to real data. Namely, abstract data and a method for regulating behavior to such data are considered through the concept of an object and data processing is carried out through message communication among objects.

For example, when terminal units for processing various sensors such as thermometer, hygrometer, etc. as the objects are considered, if a number of sensors increase, a large expansion pressure is applied to memory resources. Therefore, a technique for eliminating pressure on the resources by saving quantity of resources to be used is required.

FIG. 17 indicates an example of a structure for the conventional objected-oriented processing.

In FIG. 17, reference numeral 10 denotes memory for storing real data; 110 a class object; 111A 111C subclass objects.

In an object-oriented system, data itself has an associated procedure (method) of operation and data of each object may be altered and data processing may be carried out by sending messages among objects. A representative of objects which have the same behavior is called a class. The more embodied lower classes for upper classes are called subclasses.

In the prior art, various sensors such as thermometer, water level meter and rain gage are considered as the objects of the same kind and when data output by such sensors are processed as received messages, the objects 111A, 111B, 111C of the subclasses are generated by copying, together with the data storing region of a memory 10 for each sensor, a class object 110 as shown in FIG. 17, and thereby each sensor is defined.

Therefore, when various sensors are defined using the conventional object orientation basis, a problem arises in that a required number of capsules are generated from the class object 110 as the sensors consisting of methods and real data and the same programs as many as the number of sensors that are generated and thereby a large memory is required.

Moreover, here lies a problem that since the subclasses have all the attributes of all sensors, processings are carried out inefficiently and processing speed is also lowered. Since definition of sensor is conducted in the programs, if a sensor is defined as a part, it is difficult to use a sensor unless contents of this program is sufficiently known.

In addition, the conventional object-oriented object combines a method and real data (instance) and uses them together. Accordingly, it has been impossible to apply the method prepared as a class to the instance having another abstract meaning. Therefore, the application range of the object method becomes narrow and it has also been difficult to generate the method with the conventional technique.

It is therefore an object of the present invention to solve such problems and to deal with different data and methods as the parts for structuring objects by giving abstract meaning to such data and methods.

Moreover, it is another object of the present invention to structure an efficient and flexible system by making it possible to process data and methods as parts with the commands consisting of short code information having respective meanings.

It is another object of the present invention to conduct ordinary processes, such as transfer and distribution of data, with short commands in place of processing indirectly the real data and provides outputs at a high speed by extracting real data from commands when it is finally required to output the real data to an external apparatus.

In addition, it is also an object of the present invention to provide a means for alleviating labor for program development by saving memory by suppressing the appearance of a large number of methods having similar contents for operating the real data and by widening application range of methods by realizing free combination of methods and instances.

SUMMARY OF THE INVENTION

The present invention caches the real data with the object, selects a method for processing real data by considering it as an actor, forms an object by capsulating instance including real data and method, and realizes data processing with a computer under the guidance of actor, namely real data.

Therefore, the object sensor processing method of the present invention defines the code, which identifies instance including real data forming an object and method and is given the meaning in accordance with application or function, as the command.

The real data given the meaning by the command required to form the object can be used as the part, object sensor by registering the defined commands and attribute information to the determined part file.

An instance indicated by a command by a message including a command generated by a certain object is combined with a necessary method by dynamically selecting it and thereby the instance indicated by command and method for processing it are capsulated to form an object.

A set of such command and real data is taken as an object sensor to form a model of a processing object by the object sensor and the desired data processing is carried out on the basis of the object sensor.

In such a processing method, a method common to the objects of the same attribute are previously installed. Namely, it is stored in the memory in an executable condition.

A method previously installed is dynamically combined with the instance including real data indicated by a command by registering such command and its attribute information with the determined part file and the instance combined with the method is operated as the capsulated object.

A processor by a computer for executing such processings comprising:

a part file for storing information regarding instance including real data used as the part to form an object and method;

part registering means for defining, as a command, the code which identifies each part forming an object and is given the meaning in accordance with application or function and registering such command and its attribute information to the part file as the part information;

realization table having corresponding information between command and storing region of real data; and input/output means providing various means for processing commands as the data without executing direct processing by extracting actual real data on the occasion of various processings including retrieval and transfer in regard to the one or a plurality of parts and finally obtaining real data from the necessary commands by making reference to the realization table and outputting such data after development on the occasion of requiring display of real data, namely outputting real data to external apparatus such as a display.

A memory region for storing real data, namely a memory (including file) is assigned for each application or function of real data. Moreover, a file management table is provided for managing the storing region of memory for each application and function and also managing code information of a command given to the real data stored in the newly acquired storing region for each application and kind of function. When it is requested to reserve the storing region for the real data depending on application or a kind of function, the code information is given by the file management table and the command to be assigned to such real data is determined.

With the structure explained above, the real data is given a command, and thereby a part as the object sensor may be obtained. The object sensor means those which feel an object or is a source to form an object. The object sensor is not only inorganic data but is followed by a method for operating on the real data with a command depending on application or function and is thereby capable of modeling the real area of the concept level with abstract data.

The object sensor is a basic structural element as an actor to form a data leading type data processor. When the object using an actor as an element generates operation designation information and an operation object command, a new actor is dynamically combined with a method extracted by the operation designation information and command with such command to form the object. A processor based on the actor as significant real data depending on application or function may be realized because the command is issued and received subsequently within the data processing means structured by many objects.

PREFERRED EMBODIMENT OF THE INVENTION

A basic preferred embodiment of the present invention will be explained with reference to FIG. 1 and FIG. 2.

Figure 1:
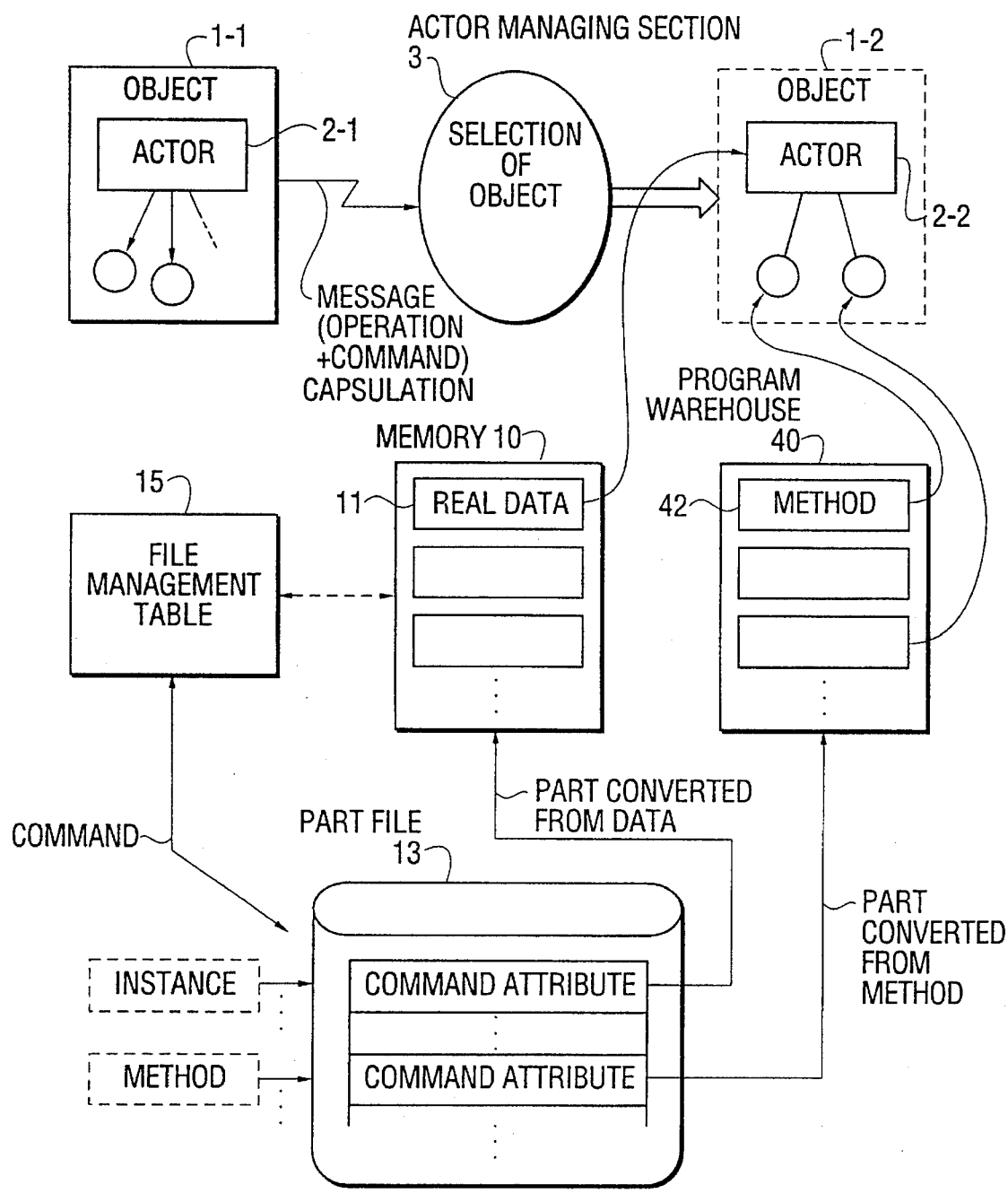
FIG. 1 is a diagram indicating a basic preferred embodiment of the present invention.
Figure 2:
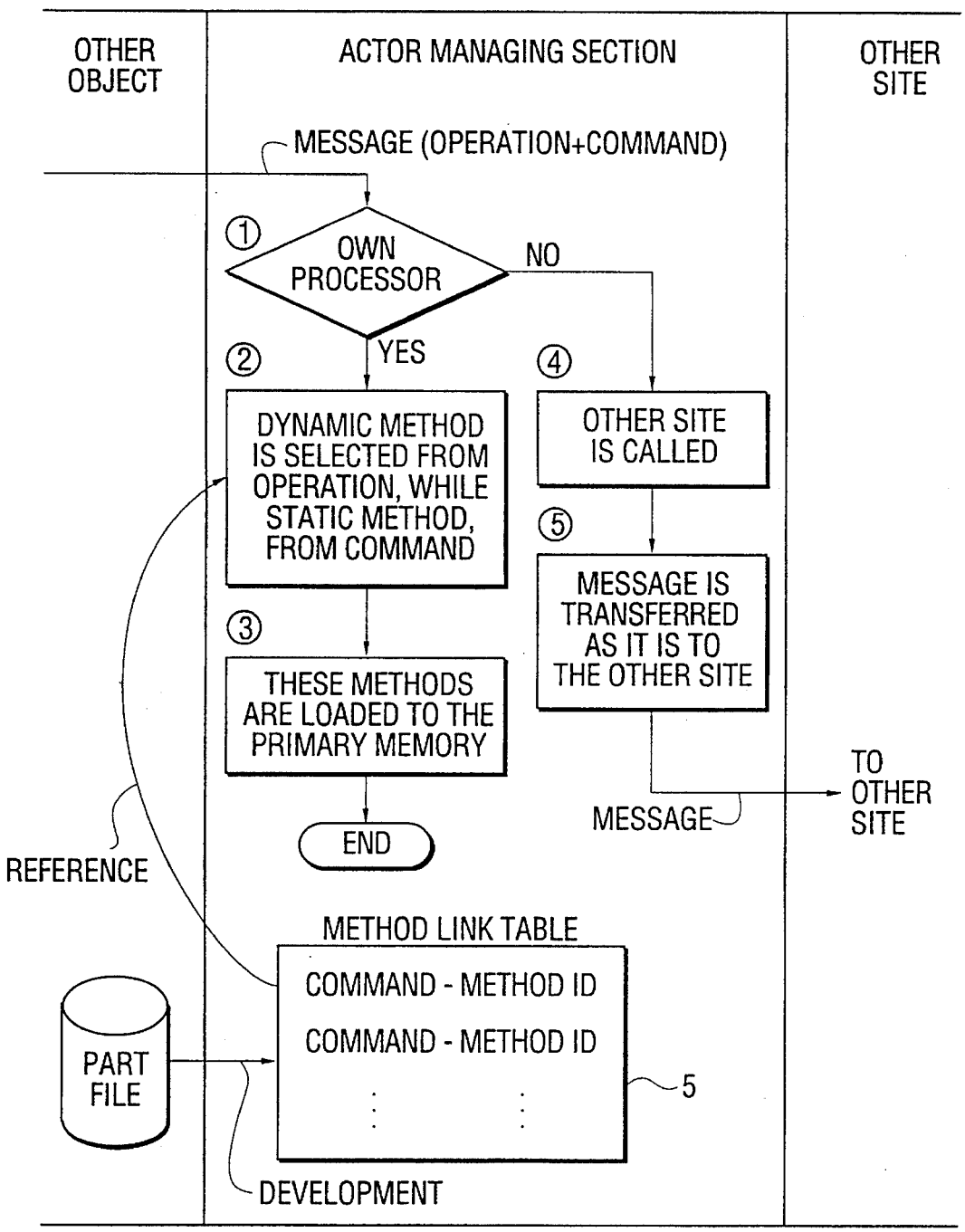
FIG. 2 a processing flowchart of actor managing section shown in FIG. 1.

In FIG. 1, 1-1, 1-2 designate object respectively. In the base of the present invention, an object is composed of an instance and a method for processing it. The instance is a real data or object and low order objects are comprised, in some cases, within an object. The lowest order instance is a real data 11 existing in a memory 10. The memory 10 is a certain storing region which may be implemented by a primary memory or a file on an external storage device.

The instance including real data 11 is converted to a part and previously registered in a part file 13.

The method 42 is also converted to a part and stored in a program warehouse 40 which is a kind of memory. The method 42 means procedures (programs) for processing the instance and various restrictive conditions associated therewith. The method 42 includes a static method uniquely determined depending on application or function of real data 11 which means instance and a dynamic instance which is dynamically combined with the instance with designation by operation explained later.

The instance and method 42 are individually registered as the parts in the determined part file 13. A significant code is given depending on application or function by the file management table 15. The significant code is called a command.

The command and various attribute information such as a nomenclature which is freely given by a person in charge of registration, comment, keyword, address information or capacity may be stored in a part file 13.

A significant real data (instance) in the object is called an actor. For instance, behavior of system as a whole is determined mainly by the actor 2-1 in the object rather than by various methods.

A message is transmitted when the object 1-1 asks the other object 1-2 to perform some processing. This message includes operating information for designating, for example, how the processing objects such as edition, transfer or output should be processed and a command for designating processing objects registered in the part file 13. Moreover, the identification information of the object to be transmitted to and parameters are also added but these are not essential.

When a message is issued, the actor managing section 3 executes control for the request and substantially controls all objects.

The actor managing section 3 decodes the message and executes, for example, the processings 1~5.

① With an operating information in the message, it is decided whether the data should be processed in the own processor or in the other site, namely in the other terminal unit. The operating information in the message includes a terminal number for identifying terminal units connected through a network and it can be decided whether the data should be processed in the own processor or not depending on such terminal number. When the terminal number indicates the other site, the processing jumps to the processing 4.

② For the message indicating processing in the own processor, a dynamic method is selected from the operating information in the message. Moreover, a static method is selected from the command. The corresponding information of method ID for identifying a command and a method is previously developed in a method link table 5 based on the command and attribute information registered in the part file 13. The actor managing section 3 recognizes the necessary methods by making reference to the method link table 5 when selecting a method from the operating information and the command.

③ A selected method is extracted from a program warehouse 40 and it is then loaded to a primary memory. Thereby, the actor 2-2 corresponding to the real data 11 of the processing object is combined with the selected executable method to form an object 1-2 for executing the processing in regard to the message by which the object 11-1 is generated.

④ When a message designates the processing in the other site, the other site is called.

⑤ The terminal unit of the other site having receiving such a message executes necessary processing in regard to the message in the same way from the actor managing section operating on the same apparatus.

As explained above, the present invention executes data processing by selecting the necessary methods depending on the message mainly with the actor and then capsulating such methods. The elements of such actor, namely the command as the part and real data are called object sensors in the present invention and modeling may be realized with such object sensors on the occasion of considering the real area as the processing object on the computer system.

A more practical processing structure and application example will be explained in more detail with reference to the accompanying drawings.

Figure 3:
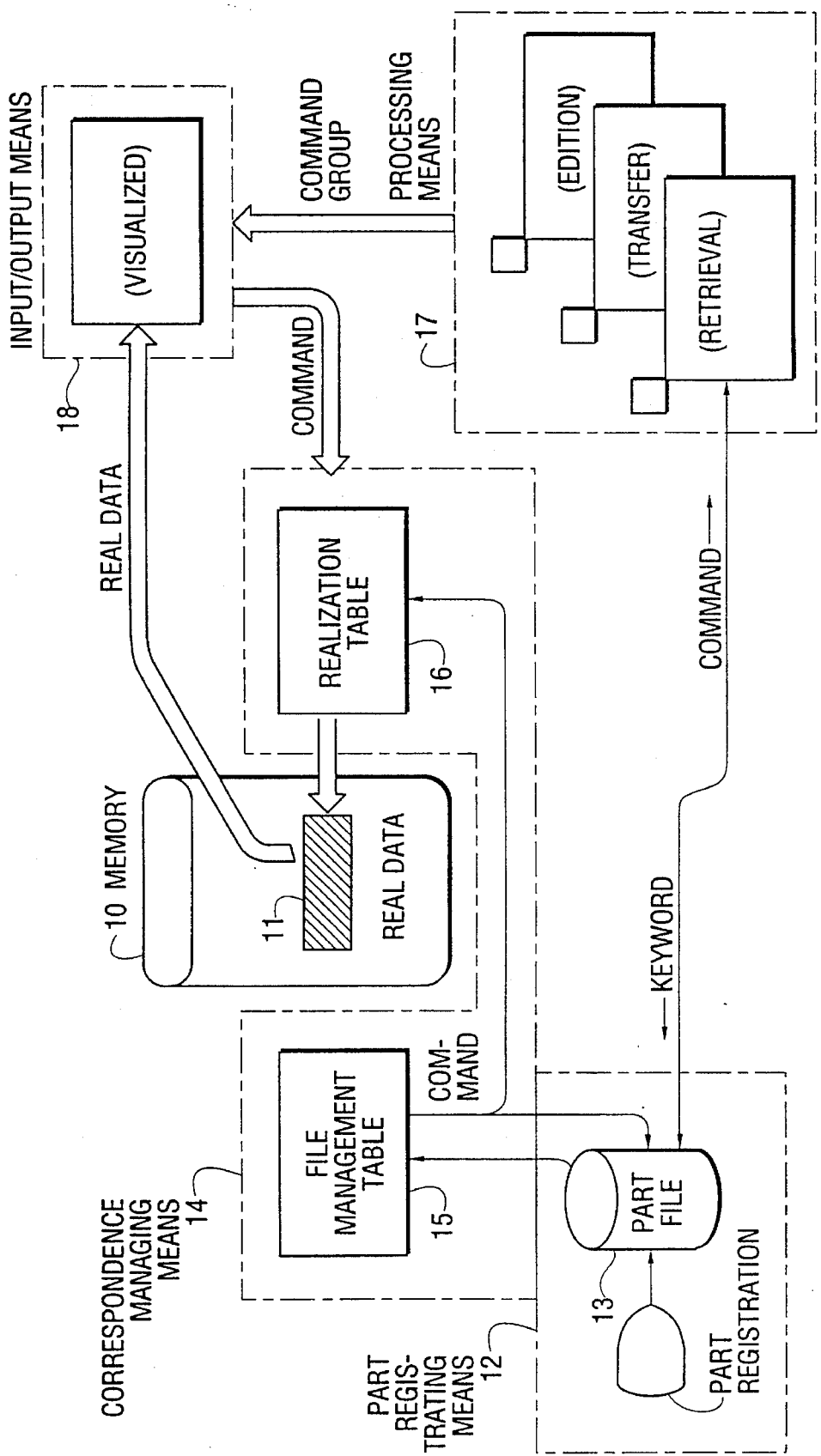
FIG. 3 is a diagram for explaining the essential portion of a preferred embodiment of the present invention.

In FIG. 3, the elements like those in FIG. 1 are designated by the like reference numerals. Numeral 12 denotes part registering means for registering a unit of memory 100 storing respective real data as a parts; 14, correspondence managing means; 16, realization table having correspondence information between command and real data storing area; 17, various processing means consisting of various method groups; 18, input/output means for visualizing real data.

The memory 10 is classified for each application and function and the storage region thereof is divided into sections with a certain unit and each section is given a meaning as a part. This part is called here an instance object sensor (same as an actor). The part registering means 12 registers the part given abstract meaning to the part file 13. The part file 13 stores attributes such as nomenclature of part, summary and keyword and command formed by codes which may be identified by giving meaning to the real data 11 which is given later by the correspondence managing means 14.

The correspondence managing means 14 gives commands formed by codes for identification to the parts registered in the part file 13 based on the file management table 15 and manages correspondence information in regard to accommodating positions of commands and real data 11 with the realization table 16.

A processing means 17 deals with the commands given from the part file 13 or other processors as the data in place of the actual real data, on the occasion of when executing various processings such as retrieval and transfer for the one or a plurality of parts, and executes various processings with commands.

In this processing, although it is unknown what is accommodated as the real body of the real data 11 indicated by the command, information about attributes required for processing may be obtained from the part file 13.

When display of selected real data 11 is required as the processing result, the processing means 17 sends a command group combining commands to the input/output means 18 in place of the real data 11. The information combining a plurality of commands is the one data and a command representing such command group is also provided. Transmission of command group means transmission of command which indicates such command group as a part data.

The input/output means 18 obtains corresponding real data 11 from each command forming a command group with the realization table 16 and outputs embodied real data 11 to a display or other input/output means.

When a command for real data 11 requires producing an image, such image is developed at the time of output. When the command of real data 11 requests a character text, it is output after it is developed into a character pattern. Moreover, when the command of real data 11 indicates, for example, the voice data, it is output from a speaker as the voice signal.

As explained above, a certain unit of memory 10 is registered as a part, a command is given to such part and the processing is executed with a command formed by a short half-fixed code data in the ordinary processing in place of processing in direct the real data 11 stored in the memory 10. Accordingly, the processings have the following characteristics.

(1) Since a part of real data 11 is processed with the code called a command, abstract meaning can be given to the real data 11 by giving the meaning to a part of such code through classification. For example, it can be decided whether the corresponding real data 11 is code data or dot data or fixed data by deciding some leading characters of the command.

(2) Since a size of real data 11 may be determined freely, the memory 11 may be managed in variable length and the memory 10 may also be used effectively.

(3) Accordingly, a short length code data, a large amount of voice or image data, namely any kind of media data can be dealt with uniformly.

(4) Since processing such as retrieval or transfer may be executed with a short data command without relation to the size of real data 11, processing speed is very high.

(5) Even when data is distributed, processing may be executed only with transfer of a command until viewing is required finally and the distributed processing speed is also very high.

(6) Since part management is carried out, it is possible to give various attributes such as a nomenclature or summary to such parts.

Figure 4:
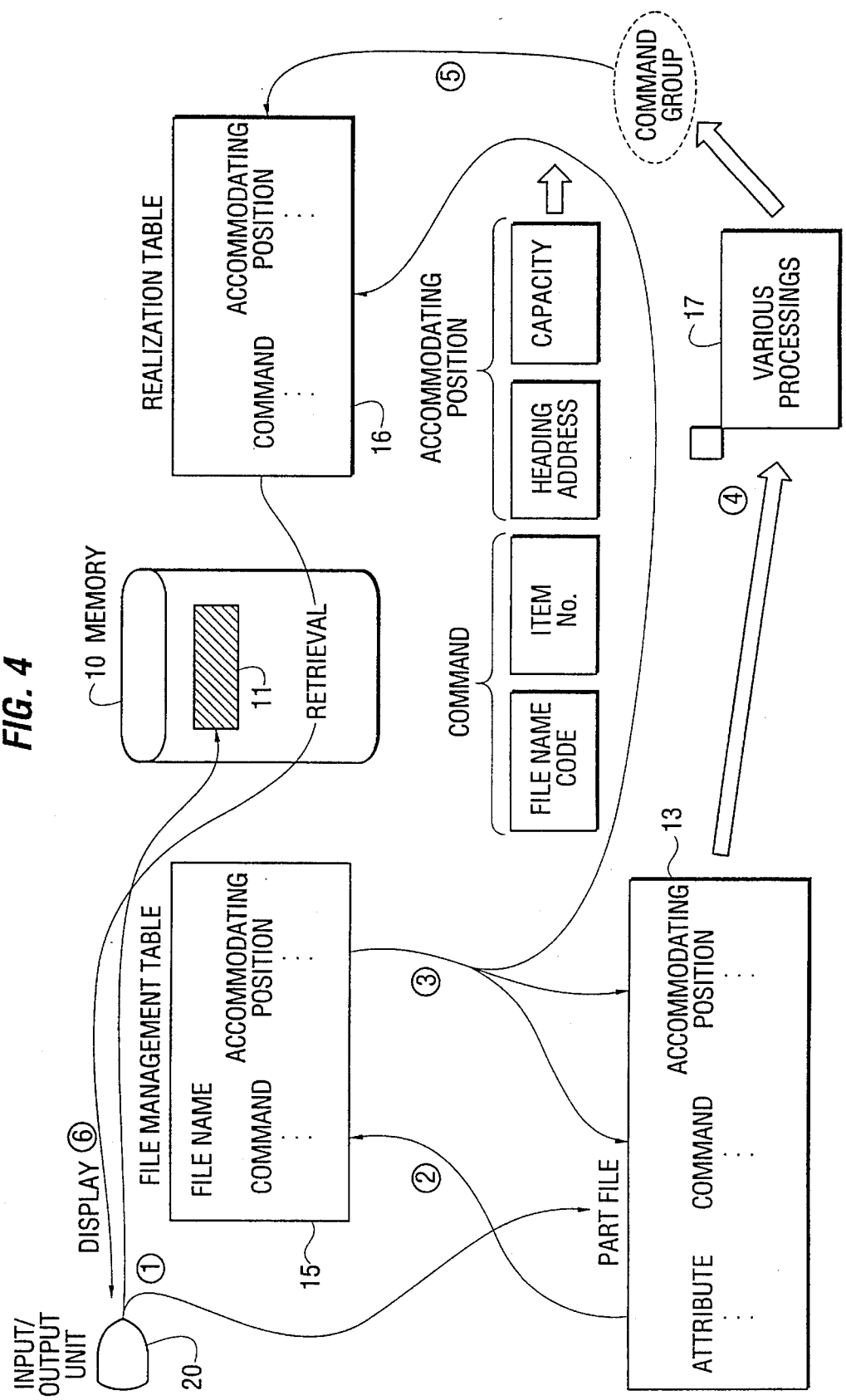
FIG. 4 is an example further embodying a preferred embodiment of the present invention.

A practical operation of processing composition shown in FIG. 3 will be explained with reference to FIG. 4. The numbers 1–6 in the following explanation correspond to the numbers 1–6 shown in FIG. 4.

① When the data as the processing object is newly defined, the attributes of part such as nomenclature, summary and keyword are input from the registered display. The entry position of the real data 11 is given or supplied from the file management table 15. The file management table 15 has the information for a vacant region in the memory 10 and the necessary region is extracted from the vacant region based on such information. As the management system for the vacant region various systems are available, reported on and described in the literature. Therefore, explanation thereof is omitted here. The attribute information of parts input from the registered display is stored in the part file 13 depending on registration instruction.

② At the time of part registration, a command is given to such part on the basis of the management data of file management table 15. Such command is formed by a file name code corresponding to application or function and item number of the memory 10. A file name code is an identifier depending on content of file (memory) and kind of operation. For example, it takes predetermined value such as "PBI" for image input data or "VAI" for voice input data. The item number indicates the number of part belonging to the same file name code.

For example, the command "PBI005" is given to the fifth image input data.

As will be assumed from above explanation, "PBI" is a command which indicates a class object and "PBI005" is a command which indicates an instance derived from the class object.

Moverover, the accommodation position information in the memory 10 is given from the file management table 15 depending on the leading address to be input and capacity.

③ The command and accommodation position given based on the file management table 15 are set in the part file 13 and is developed on the realization table 16.

④ Thereafter, retrieval, edition, transfer, distribution and other operations for such real data 11 are not referenced by the real data 11 but by the command. The part processed by this command is object sensor (namely, actor).

⑤ As will be explained with reference to FIG. 5, in case some real data 11 in relation to the command groups gathered, for example, by retrieval of remote data is visualized, the accommodation position is searched by the realization table 16 for each command forming the command group.

⑥ The real data 11 is read from the memory 10 based on the searched accommodation position and it is viewed at a time to display it on the input/output unit 20. In this case, judging from the command, the real data 11 is output to a speaker, for example, when it is detected as the voice data.

Next, an example of processings for retrieval by the keyword in the distributed system to which the preferred embodiment of the present invention is applied will be explained with reference to the step numbers 1–10 shown in FIG. 5.

Figure 5:
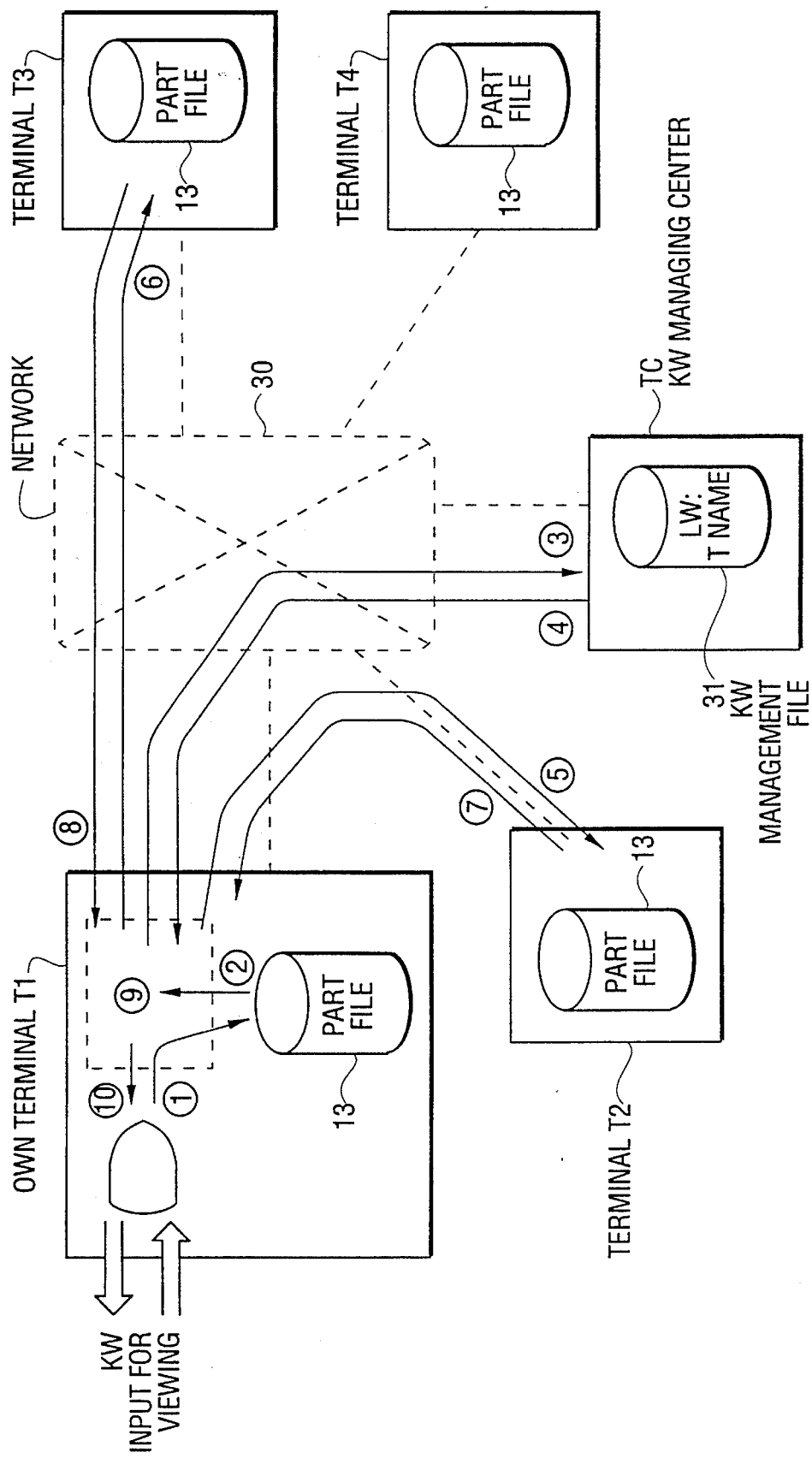
FIG. 5 is an application example of a preferred embodiment of the present invention.

In FIG. 5, the reference numeral 30 denotes a network and 31, keyword (KW) management file having management information of keyword. T1–T4 and TC denote terminals. Particularly, T1 denotes the own terminal which has issued retrieval request for data and TC, KW managing center.

① The part file 13 in the own terminal T1 is retrieved by inputting a keyword. The keyword is given previously for each part.

② A command group corresponding to the designated keyword is extracted from the part file 13 of own terminal T1.

③, ④ The KW managing center TC controls the information ensuring correspondence between each keyword and the name of terminal holding the parts having such keyword with the KW management file 31. Therefore, the own terminal T1 transfers a keyword in relation to the retrieval request to the KW management center TC and receives all terminal names having the keyword. Here, it is assumed that the terminal is designated by T2 and T3.

⑤, ⑥ The own terminal T1 sends the keyword to the terminals T2 and T3 based on the terminal names notified from the KW managing center TC.

⑦, ⑧ The terminals T2, T3 collects commands of parts corresponding to the received keyword from the part file 13 and then returns the corresponding commands to the own terminal T1.

⑨ The command of own terminal T1 and the commands sent from the terminals T2, T3 are gathered. In case some keywords are designated, the necessary commands are selected through logic operations of AND condition or OR condition of keywords.

⑩ Finally, the accommodating position of real data 11 is obtained with the realization table 16 explained with reference to FIG. 2 based on the necessary commands and thereby the real data 11 can be extracted. Although not illustrated, for the real data 11 not owned by the own terminal T1, the command is sent to the other terminal having such real data, requesting transmission of corresponding real data 11. Such real data 11 is viewed and is then output as the retrieval result of keyword.

The other processings can be executed effectively, as well as the retrieval process, by the process mainly conducted based on the commands.

Next, setting of an instance in the preferred embodiment of the present invention will be explained with reference to FIG. 6.

Figure 6:
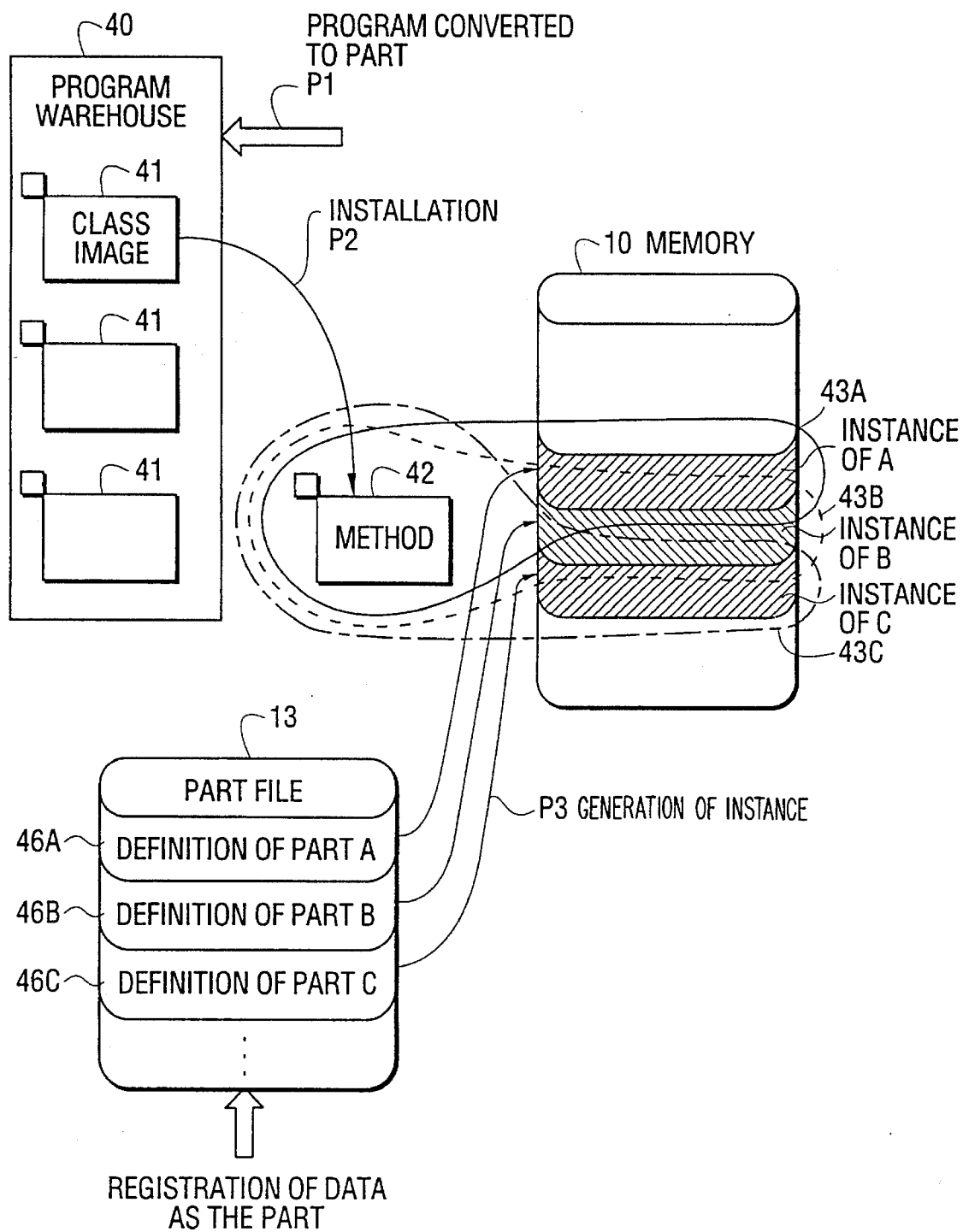
FIG. 6 is an example of setting an instance by a preferred embodiment of the present invention.

In FIG. 6, the reference numeral 10 denotes memory; 13, a part file for managing the data processed by the objects as the parts; 40, a program warehouse storing program (method) converted as the part in regard to the objects; 41, method for executing operation to the data of objects; 43A–43C, instance; 46A–46C, definition information of each part.

As indicated as PI in FIG. 6, the class objects are prepared in the program warehouse as the parts of program.

As indicated as P2, a program of the common method 42 is loaded and installed as the one object for each class image 41 when the system starts operation.

Meanwhile, definition of each instance is carried out using the part file 13 in place of the program. As indicated by P3 in FIG. 6, the data (command and its attribute information) converted as the part is registered in the part file 13, the data area for instance is reserved dynamically in the memory 10 in accordance with the definition thereof and it is then combined with the previously installed method 42. Thereby, the instances 43A–43C of object for each part can be generated.

As explained above, since many subclass objects are not generated because only one object is generated from the same class object, extra programs are unnecessary. Moreover, respective instances of such object are not defined with the program but the class is selected in accordance with a kind of data as the part (called object sensor) and sensor definition information is registered to the part file 13 as the one sensor of the sensor seed. Thereby, various instances 43A–43C are generated.

From above explanation, following characteristics may be considered.

① Installation requires only input of necessary object method, and therefore a large capacity is not required and programs may be used economically.

② The object method receives the attribute of respective sensors from the instance as the parameter for operating the sensors. Therefore, the program used is smallest in size and processing speed becomes high.

③ Required is only definition of sensor with a sensor seed. Therefore, a user is capable of structuring a system even if he is not familiar with the content of program. The sensor seed corresponds to the commands explained above.

Figure 7:
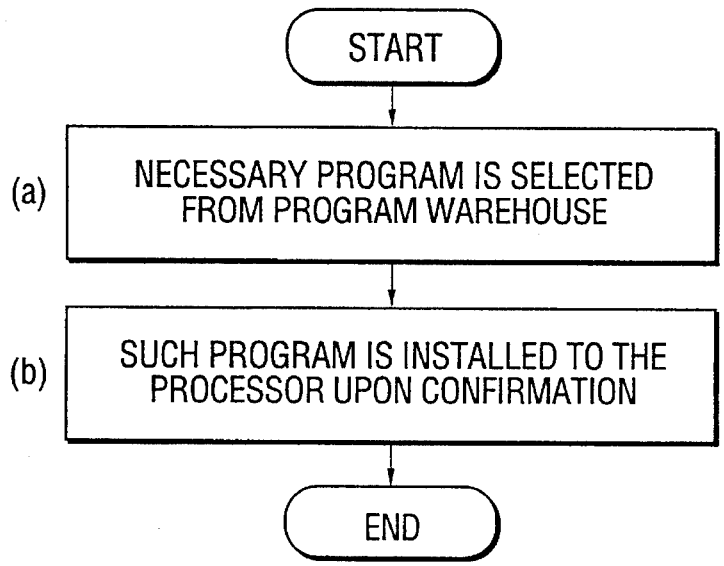
FIG. 7 is a processing flow when a system is started by a preferred embodiment of the present invention.
Figure 8:
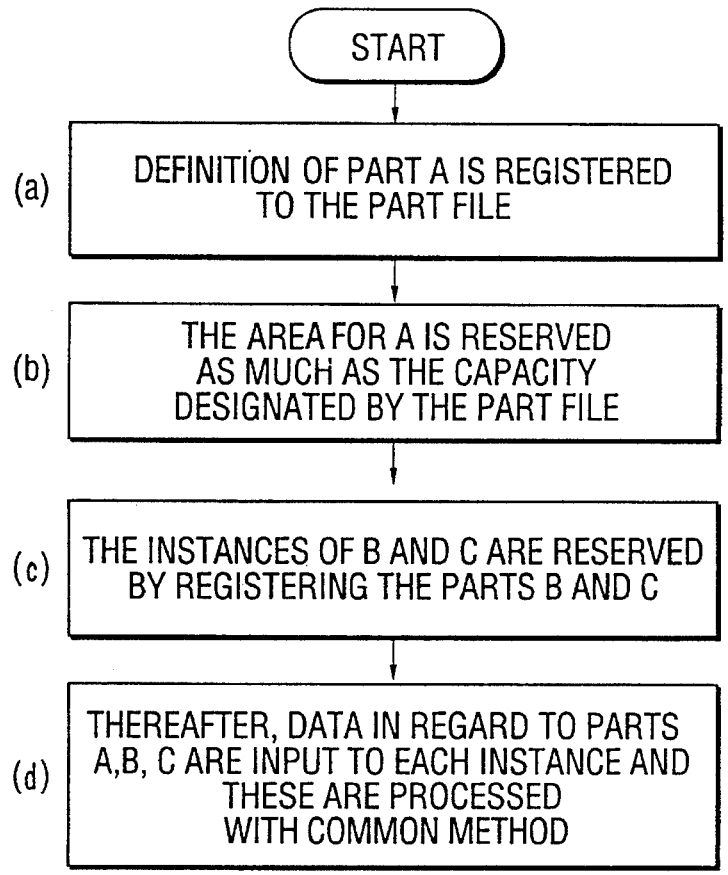
FIG. 8 is a processing of an instance generation.

The processing flow for realizing the process shown in FIG. 6 is shown in FIG. 7 and FIG. 8.

Particularly, FIG. 7 shows processing flowchart when the system starts operation.

(a) A necessary program to be used as the object method is selected from a program warehouse 4 shown in FIG. 6.

(b) Such program is installed in the processor such as a terminal, upon confirmation of users, as required. Namely, program loading is carried out to set a program in the executable condition. In this preferred embodiment, the instance is not yet generated in this timing.

Generation of instance is carried out like the processing, for example, shown in FIG. 8.

(a) When the instance in regard to a part A is generated, definition 46A of part A is registered to the part file 13.

(b) The area for the part A is reserved as many as designated by the part file 13 from the memory 10 with the part file 13.

(c) In the same way, the instances of sensors B, C are reserved by registering the parts B, C.

(d) Thereafter, data in regard to the parts A, B, C, namely the data sent from the sensors A, B, C are entered to the instances and are processed by the common method 42.

Next, a practical example will be explained with reference to FIG. 9.

Figure 9:
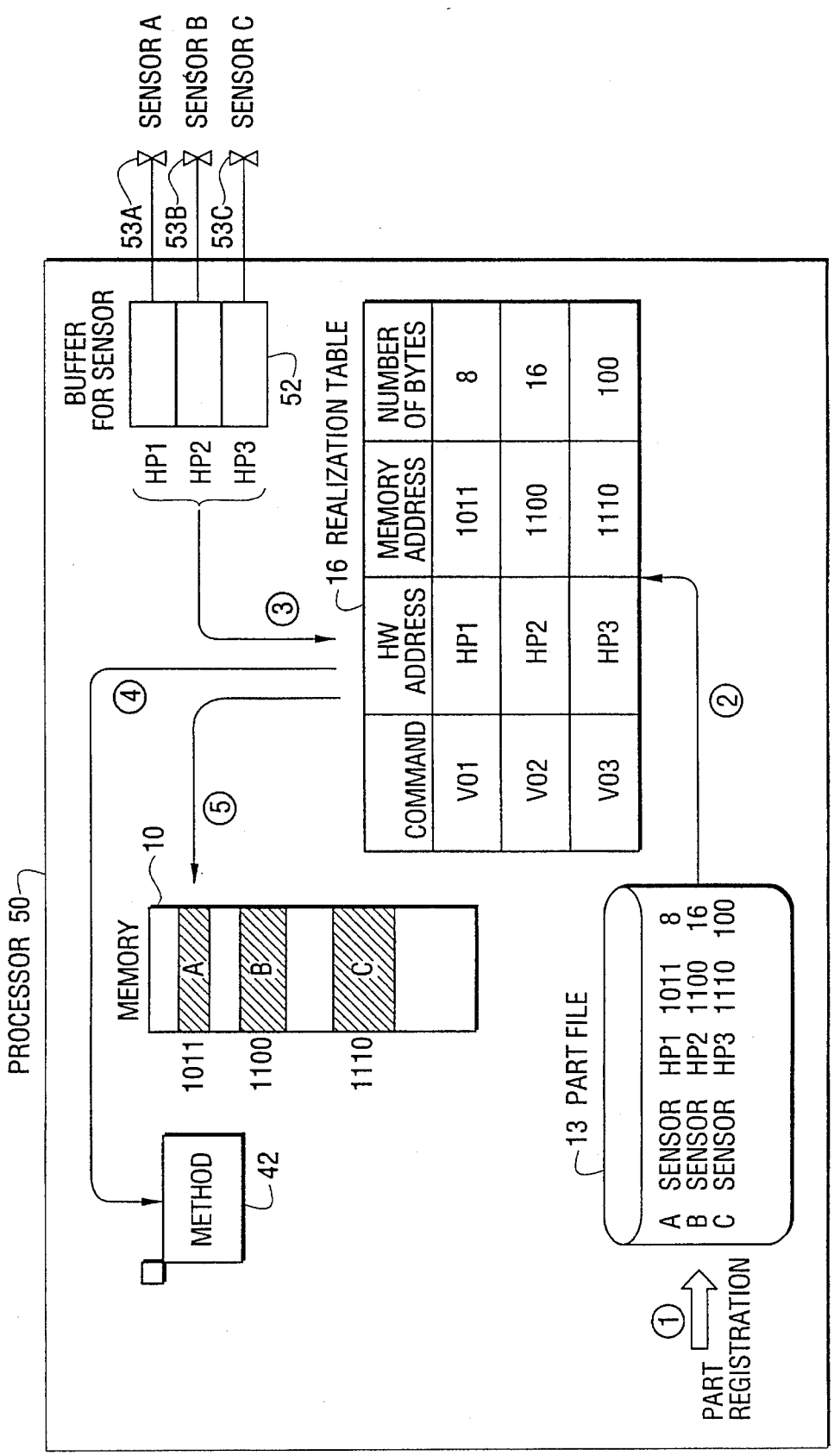
FIG. 9 is a processing flowchart for generation of an instance by a preferred embodiment of the present invention.

In FIG. 9, the reference numeral 50 denotes a processor such as terminal providing CPU and memory; 52, buffer for sensor corresponding each sensor; 53A 53C, sensors such as thermometer, water level meter and rain gage, etc.

The system may be started in the same manner as the program installation in an ordinary operating system.

Generation of instance will be explained in accordance with the steps 1~5 shown in FIG. 9.

① The A sensor 53A, B sensor 53B and C sensor 53C are respectively registered to the part file 13 as the parts. In this case, the hardware addresses HP1, HP2, HP3 of each sensor, input position, size (number of bytes) of memory are input. The hardware addresses HP1, HP2, HP3 of each sensor are pointers to buffer 52 for sensor corresponding to each sensor. The input position in the memory may be assigned automatically to the vacant area of memory 10 or may be designated manually.

② The registration information to this part file 13 is developed in the real memory in order to improve the processing speed. This is a realization table 16. The nomenclature of each sensor (A sensor, B sensor, C sensor) are respectively controlled with the codes(V01, V02, V03) of internal identification information in the realization table 16. This internal identification information is commands in relation to the present invention.

③ Any one of the sensors 53A, 53B, 53C operates and when data is written in the corresponding hardware address of buffer 52 for sensor, reference is made to the realization table 16.

④ As a result of reference to the realization table 16, the leading address of relevant area in the memory 10 and the number of bytes are transferred to the method 42.

⑤ The method 42 executes the process of writing data sent from the sensor for the designated area in the memory 21.

As will be apparent from above example, in this preferred embodiment, the necessary area is reserved in the memory 10 by definition of part to the part file 13. This process corresponds to generation of instance.

In the prior art, the size of data region of each instance must be the same, but in this preferred embodiment, the size must not be in common since definition is registered for each data as the part.

Moreover, another embodiment of the present invention will be explained with reference to FIG. 10 to FIG. 15 for easy understanding of the present invention.

Figure 10:
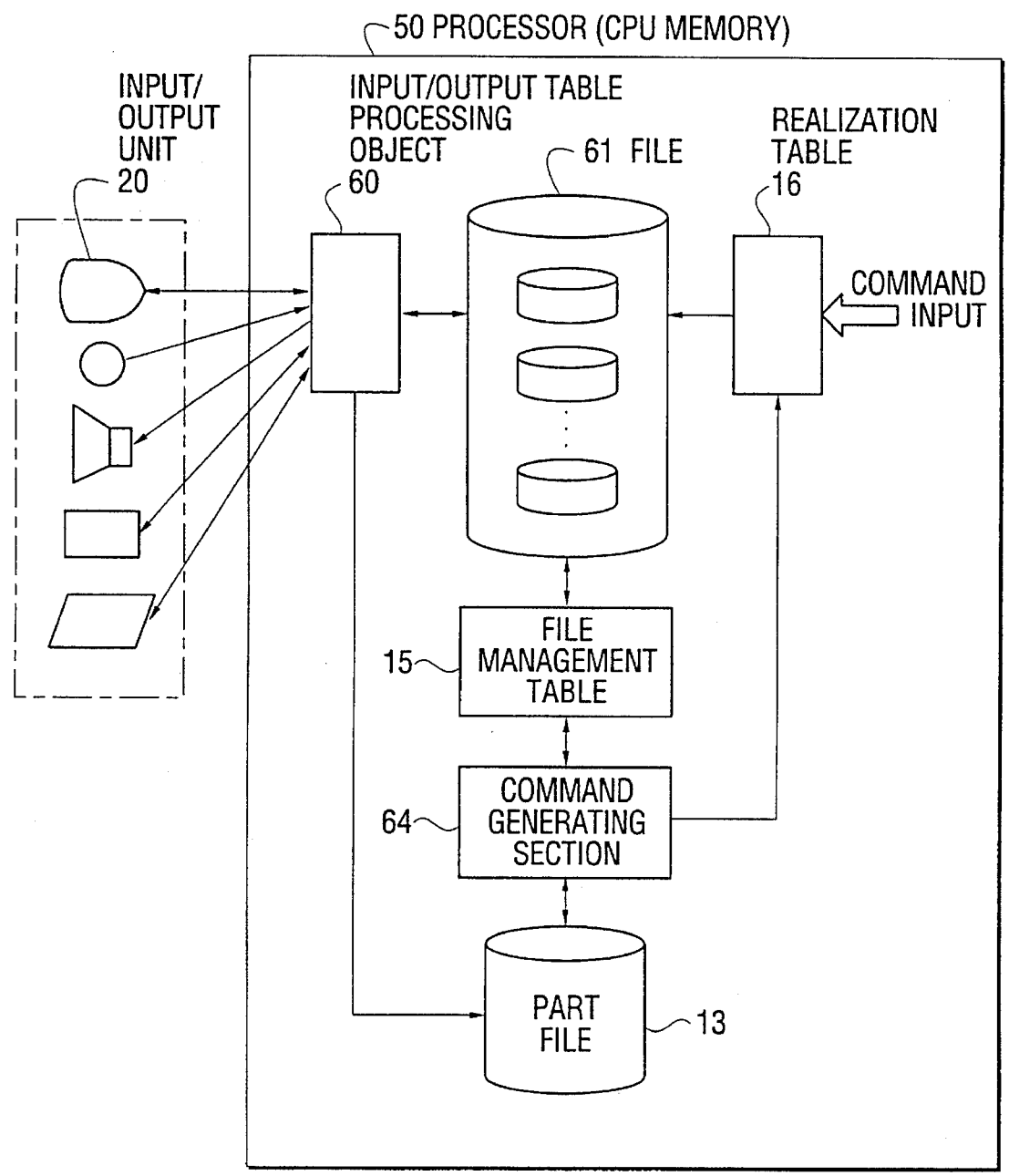
FIG. 10 is a diagram for explaining the essential portion of another embodiment of the present invention.

FIG. 10 is a diagram indicating the basic structure of another embodiment.

In this figure, the reference numeral 20 denotes an input/output unit such as an input/output unit corresponding to respective media such as display unit, microphone, speaker, facsimile, plotter and video recording/reproducing unit and an input/output unit of real sensor such as a temperature sensor and an input/output unit such as actuator, etc.; 50, a processor; 60, input/output table processing object corresponding to the input/output means 18 shown in FIG. 3 which executes input/output control for the input/output unit 20; 61, file corresponding to the memory 10 indicated in FIG. 1 which stores real data of different kinds of data in accordance with the basic unit for each kind of data; 64, command generating section corresponding to the correspondence managing means 14 shown in FIG. 33 which assigns unique commands indicating the procedure attribute to the parts registered in the part file 13 by making reference to the identification numbers controlled by the file management table 15; 16, realization table which controls correspondence between the commands assigned to the parts registered in the part file 13 and the storing address of such parts in the file 11.

As explained with reference to the exampled described above, the file management table 15 controls application region of file 61 for each kind of data, namely application or function of data and also controls the code information indicating the basic unit which is the storing region of data to be stored next. Moreover, the part file 13 deals with the basic unit of real data stored in the file 61 as the parts and controls the attribute information of such parts. The realization table 16 controls correspondence between the commands assigned to the parts registered in the part file 13 and the storing address in the file 61 of such parts.

The file management file 15 shown in FIG. 10 controls where the data input next should be stored in the storing region for each class of data. Since the basic unit in the quantity of data to be input is determined for each class of data, structure is formed so that management of the storing region of data to be input next is executed in accordance with the identification number of each class of data. For example, management is carried out so that the next code data input from the display unit of the input/output unit 20 is stored in the storing region of the n-th basic unit from the leading position of the data region for display unit which is previously reserved.

The input/output table processing object 60 registers, in accordance with the dialogue process with an operator, the attribute information such as nomenclature, comment and keyword in regard to the part of real data stored in the file 61 to the part file 13. At the time of this registration, a class of command indicating application or function is designated as the attribute information of parts stored in the file 61 from an operator. The command generating section 64 executes the processing so that correspondence between the assigned command and storing address on the file 61 of such part is registered to the realization table 16.

As explained above, a unique command is assigned automatically to the part to be registered in the part file 13 in accordance with the processing by the command generating section 64.

The commands assigned to the part is ensured that it is unique in the processor 50 and regulates the behavior of the data of such data. From this fact, the data processing means in the processor 50 is capable of executing data processing by sending and receiving such commands.

When it is requested that the parts must be viewed (output) for an operator, the storing address of file 61 is determined in accordance with the realization table 16 and the data of part stored in the storing address is read from the file 61. The data read out is output to the corresponding input/output unit 20.

As explained above, while data processing is executed in accordance with commands, high speed output processing for the external apparatus of the data corresponding to the commands is realized in accordance with the realization table 16.

Figure 11:
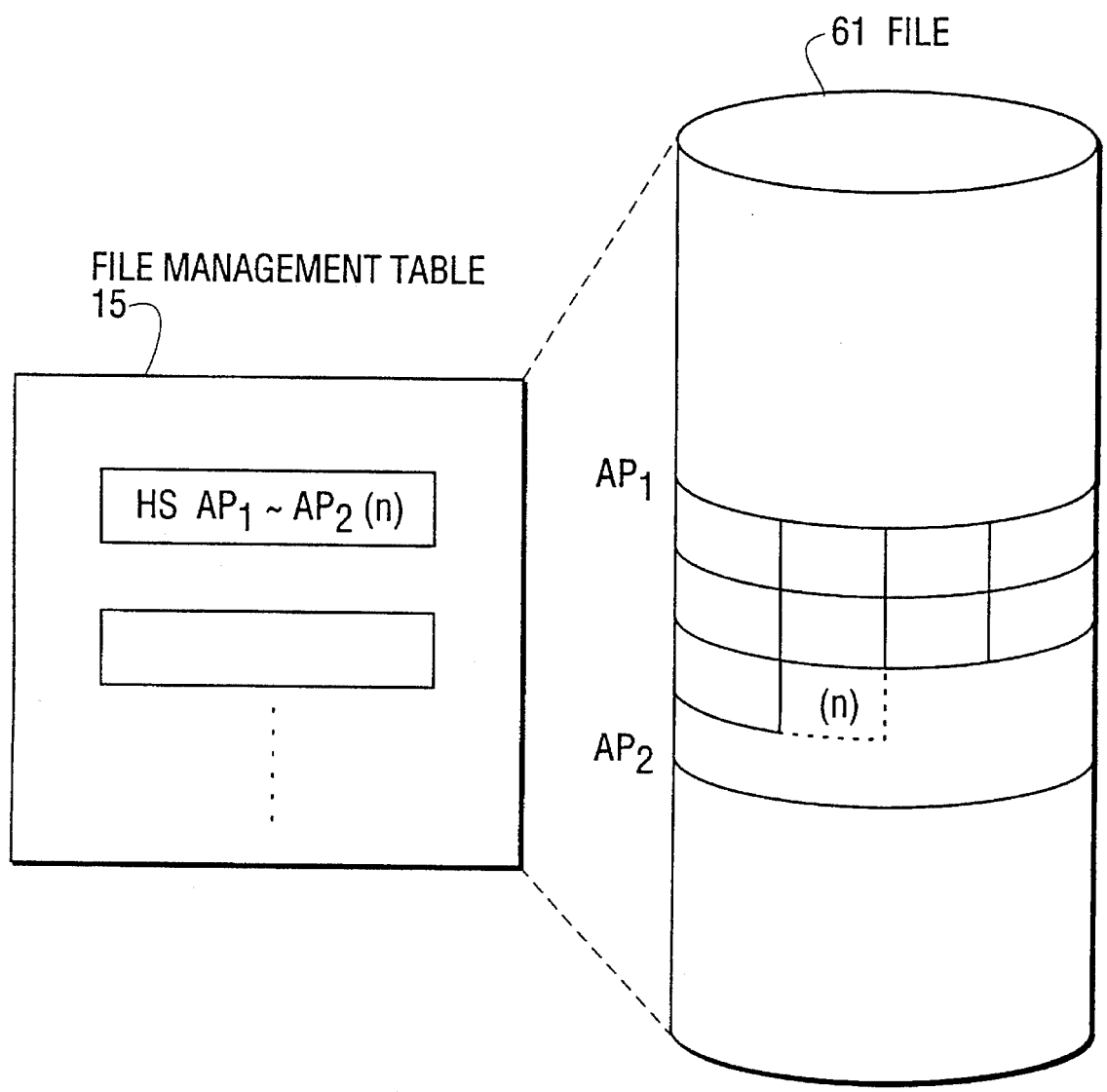
FIG. 11 is a diagram for explaining a file management table in relation to a preferred embodiment of the present invention.

FIG. 11 is an example of management data of the file management table 15.

"HS" in the file management table 15 in FIG. 11 indicates, for example, a class of command to be assigned to the data of real sensor such as temperature sensor, while "$AP_1$" indicates the heading address of the region of file 61 reserved as the storing region for the data of real sensor. "$AP_2$" indicates the termination address of the region in the file 61 to be reserved, while (n) indicates write address number for designating the basic unit region which becomes the storing region of the input data (structured so that input is made in the basic unit of the particular byte length) from the real sensor.

As explained above, the file management table 15 controls the application region of file 61 for each class of data and controls the write address number for designating storing region of data to be stored next for each class of data.

Figure 12:
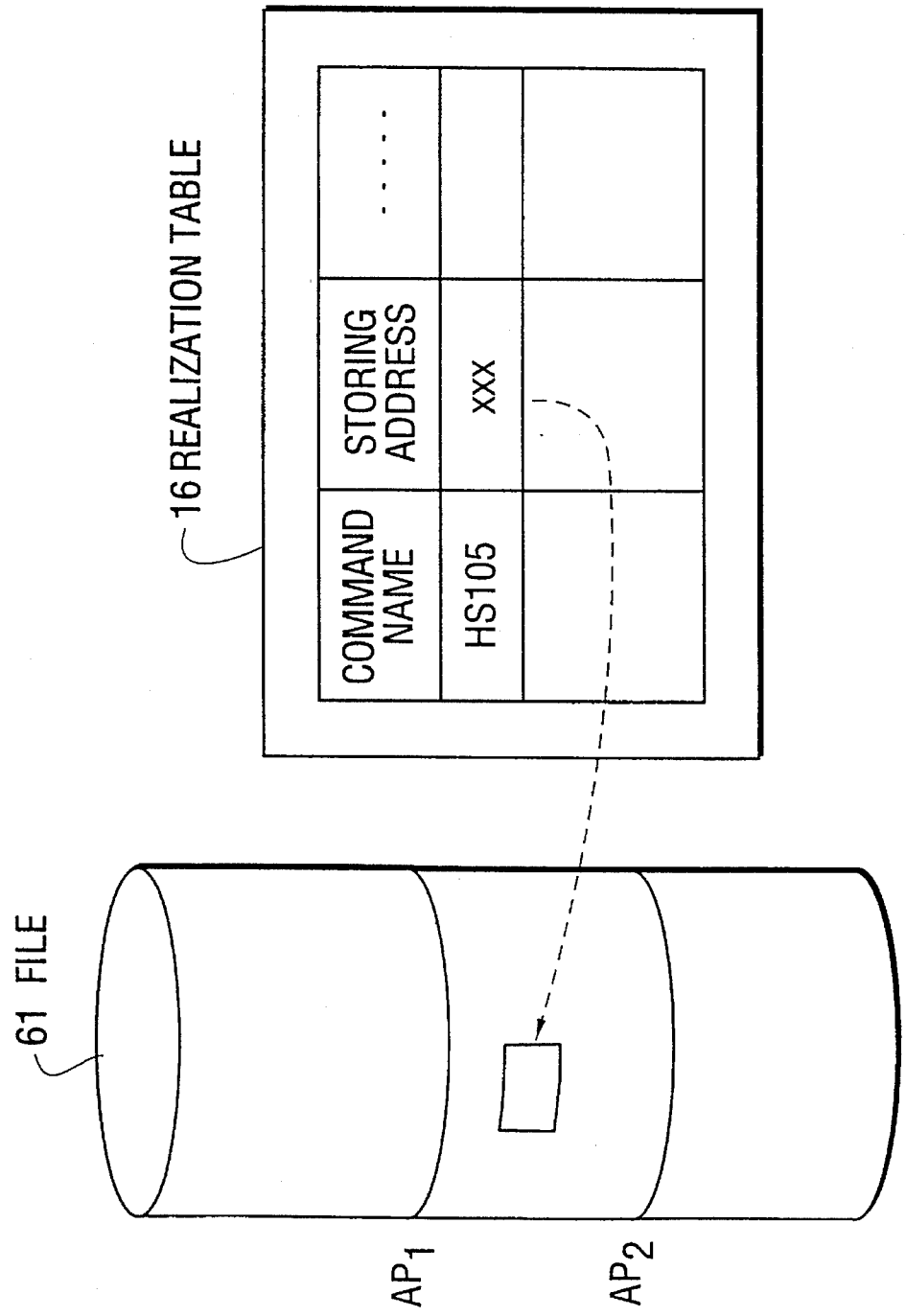
FIG. 12 is a diagram for explaining a realization table in relation to a preferred embodiment of the present invention.

FIG. 12 is an example of managing data of realization table 16.

"HS105" in the realization table 16 shown in FIG. 12 indicates the commands assigned to the data stored in the file 61 in accordance with the processing of the flowchart explained later and registered to the part file 13, while "XXX" indicates the storing address of assigned data of the command "HS105". As explained above, the realization table 16 is structured so that the correspondence between the commands assigned to the parts registered in the part file 13 and the storing address in the file 61 of the parts.

Next, registration process of the part as a data unit stored in the file 61 in accordance with the flowchart of FIG. 13 will be explained.

Figure 13:
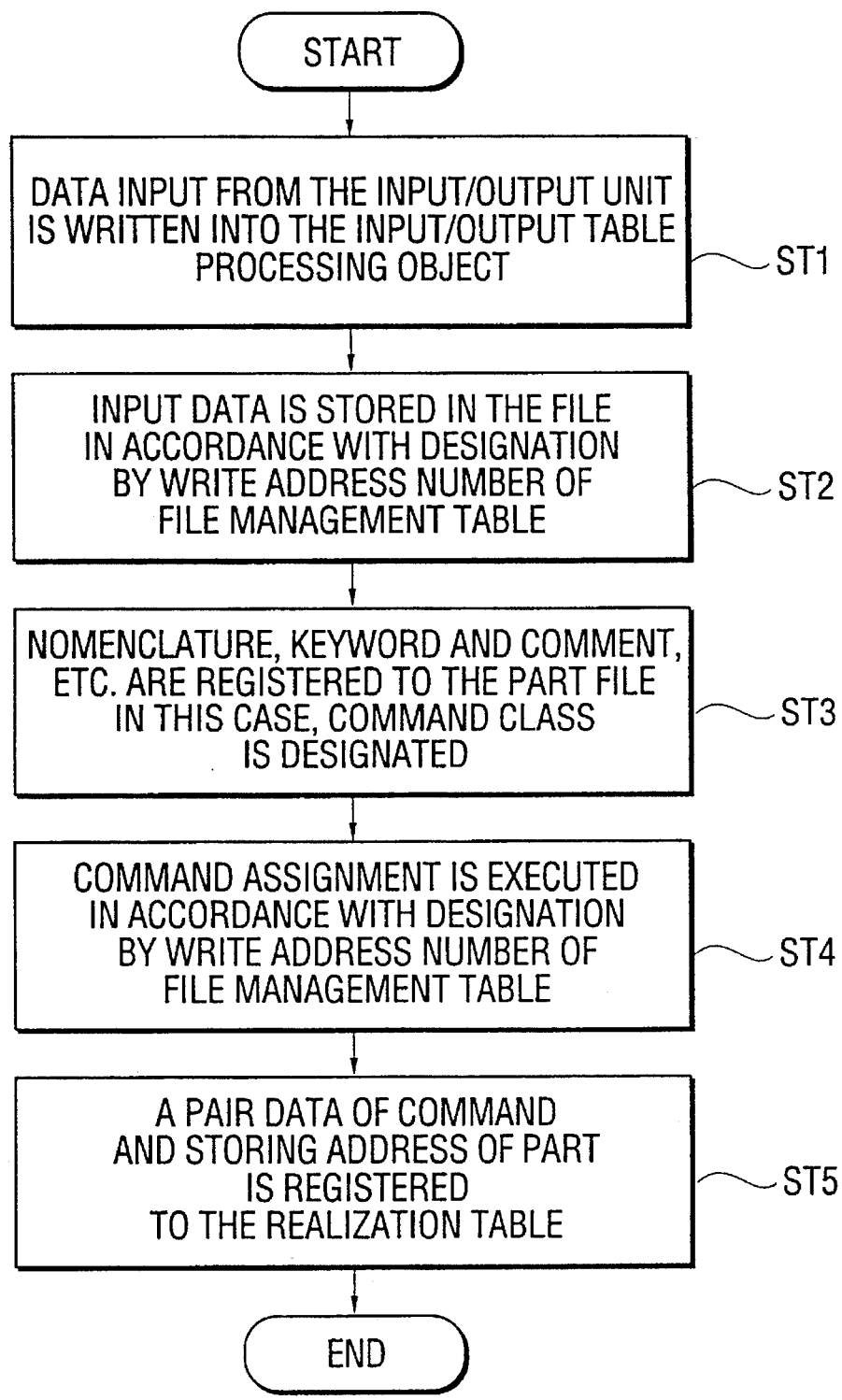
FIG. 13 is a processing flowchart of part registration processing in relation to a preferred embodiment of the present invention.

For registration of parts, as shown in the flowchart of FIG. 13, the processing of writing the data input from the input/output unit 20 to the input/output table processing object 60 is first executed in the step ST1. This writing process is executed, as explained above, using the particular byte length as the basic unit.

Next, with reference to the write address number of class of data corresponding to the file management table 15, the processing for storing data written in the input/output table processing object 60 is executed, in the step ST2 for the basic unit region of the file 61 designated by the write address number.

Subsequently, the attribute information such as nomenclature, comment and keyword, etc. of the part stored in the file 61 is registered to the part file 13 in accordance with the registration instruction from an operator due to the menu in the step ST3. In this case, the processing for designating a class of command assigned to the part to be registered is executed.

When a class of command is designated in accordance with the processing of the step ST3, an write address number is added to the class of command designated in the step ST4, by making reference to such write address number for corresponding class of data of the file management table 15. Thereby, a unique command is assigned to the system and the assigned command is registered to the part file 13. When the processing of step ST4 is executed, the write address number of file management table 15 is updated for registration of the next part.

When registration process to the part file 13 is completed, the pair data of the command of part registered and the storing address of the file 61 of the part is registered to the realization table 16 in the step ST5, completing the part registration processing. The processings executed in the step ST4 and step ST5 correspond to the function block indicated as the command generating section 64 in FIG. 10.

Figure 14:
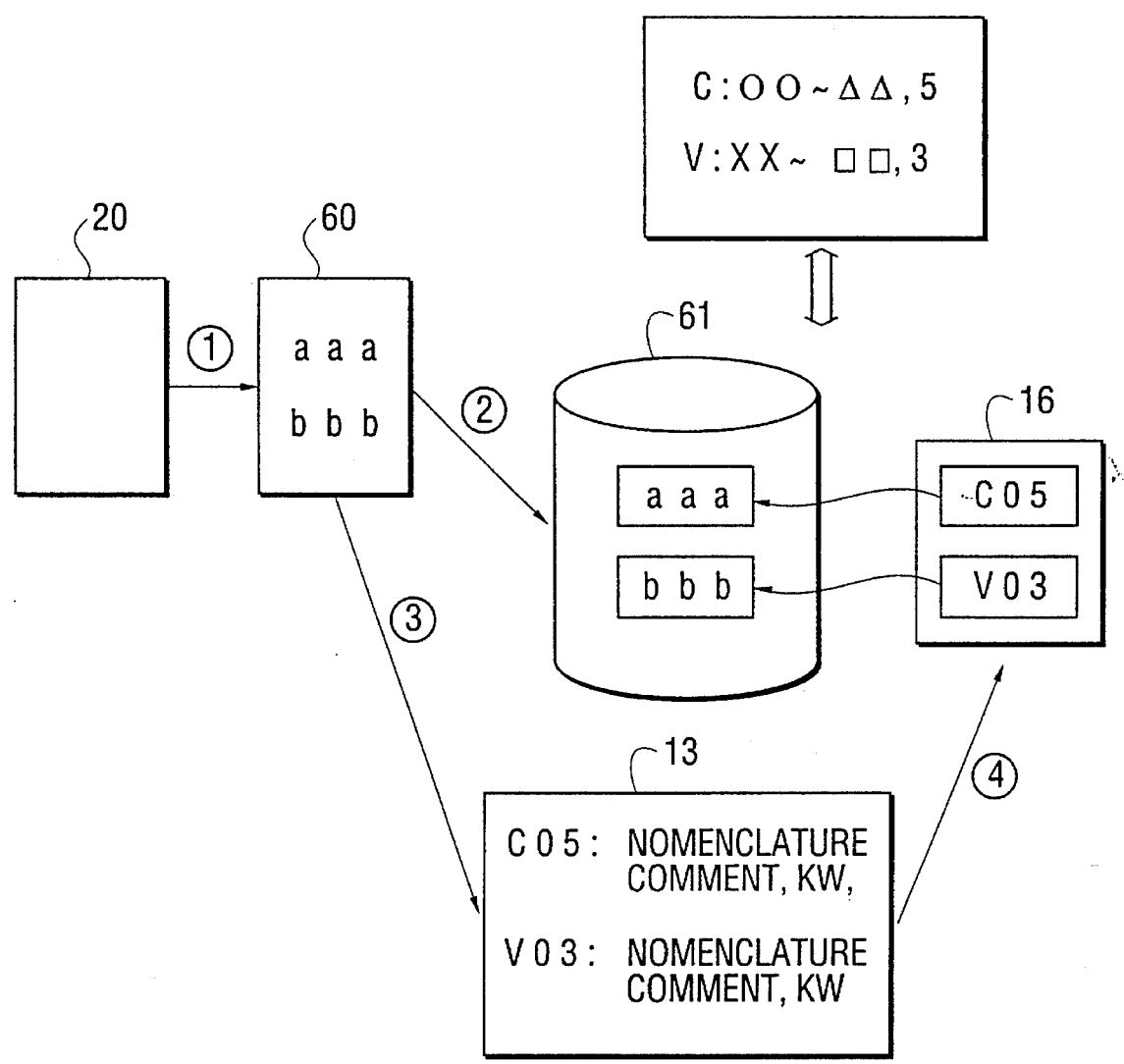
FIG. 14 and FIG. 15 are diagrams for explaining the processings by a preferred embodiment of the present invention.

FIG. 14 indicates an example of part registration executed in accordance with the flowchart of FIG. 13. Registration of part is carried out as explained in the following steps 1–4 .

① The data "aaa" is input from the input/output unit 20 of the display unit to the input/output table processing object 60 and the data "bbb" is also input from the input/output unit 20 such as a microphone to the input/output table processing object 60.

② In accordance with the storing instruction, the data "aaa" is stored in the storing region of file 61 designated by the write address number for display unit of the file management table 15 and the data "bbb" to the storing region of file 16 designated by the write address number for microphone.

③ The command C05 is assigned to "C" designated as the class of command of data "aaa" by adding the write address number for display unit of the file management table 15 and the command V03 is assigned to "V" designated as the class of command of data "bbb" by adding the write address number for microphone of file management table 15. These are registered to the part file 13 and the attribute information such as nomenclature of part, comment and keyword, etc. is registered to the part file 13.

④ Correspondence between the assigned command C05 and storing address of data "aaa" is registered to the realization table 15 and correspondence between the assigned command V03 and storing address of data "bbb" is also registered.

As explained heretofore, a unique command is assigned to the part stored in the file 61. This command specifies the behavior of the data of such part and the data processing means in the data processor executes the processing of data by sending and receiving this command.

Figure 15:
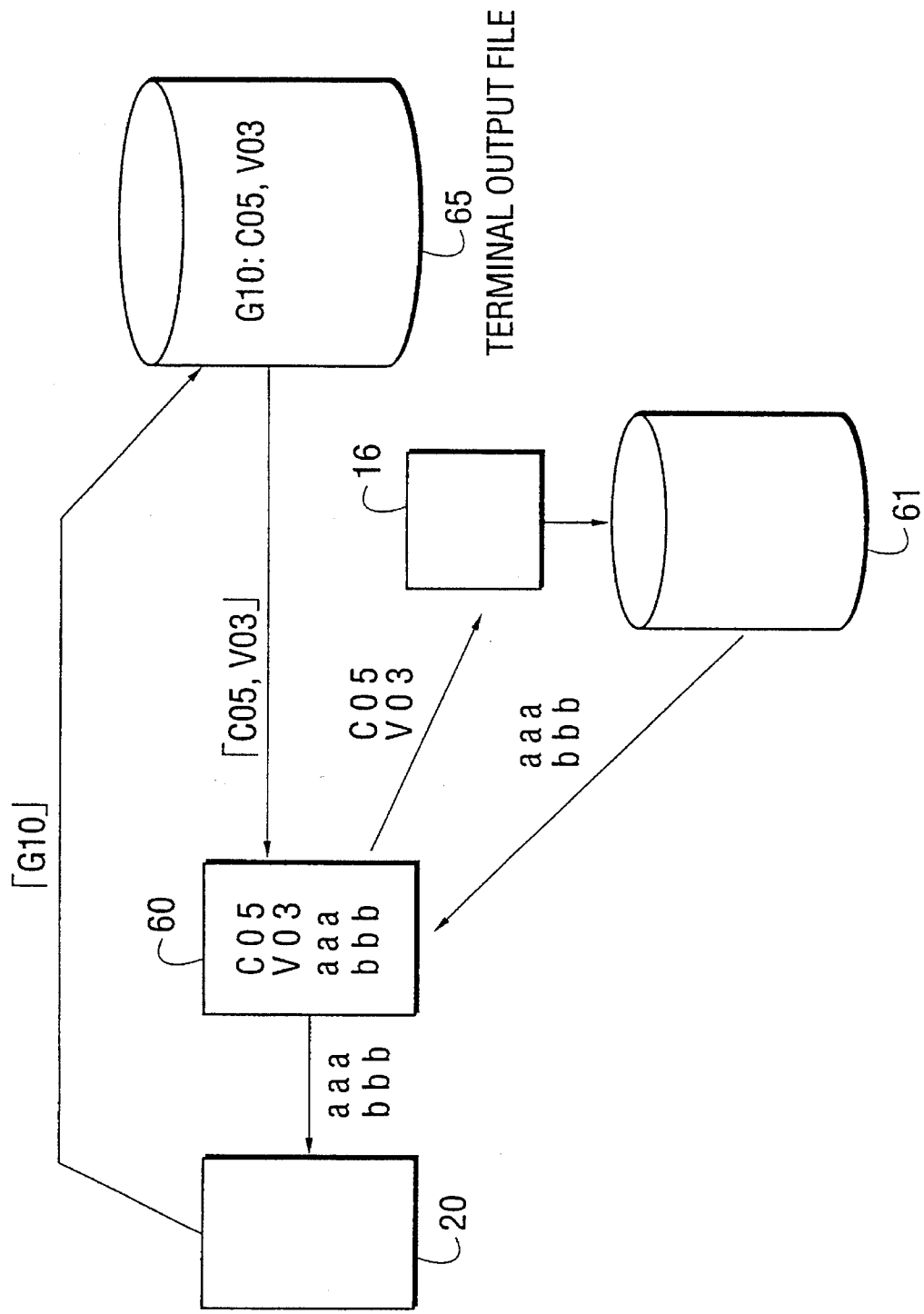
Figure 16:
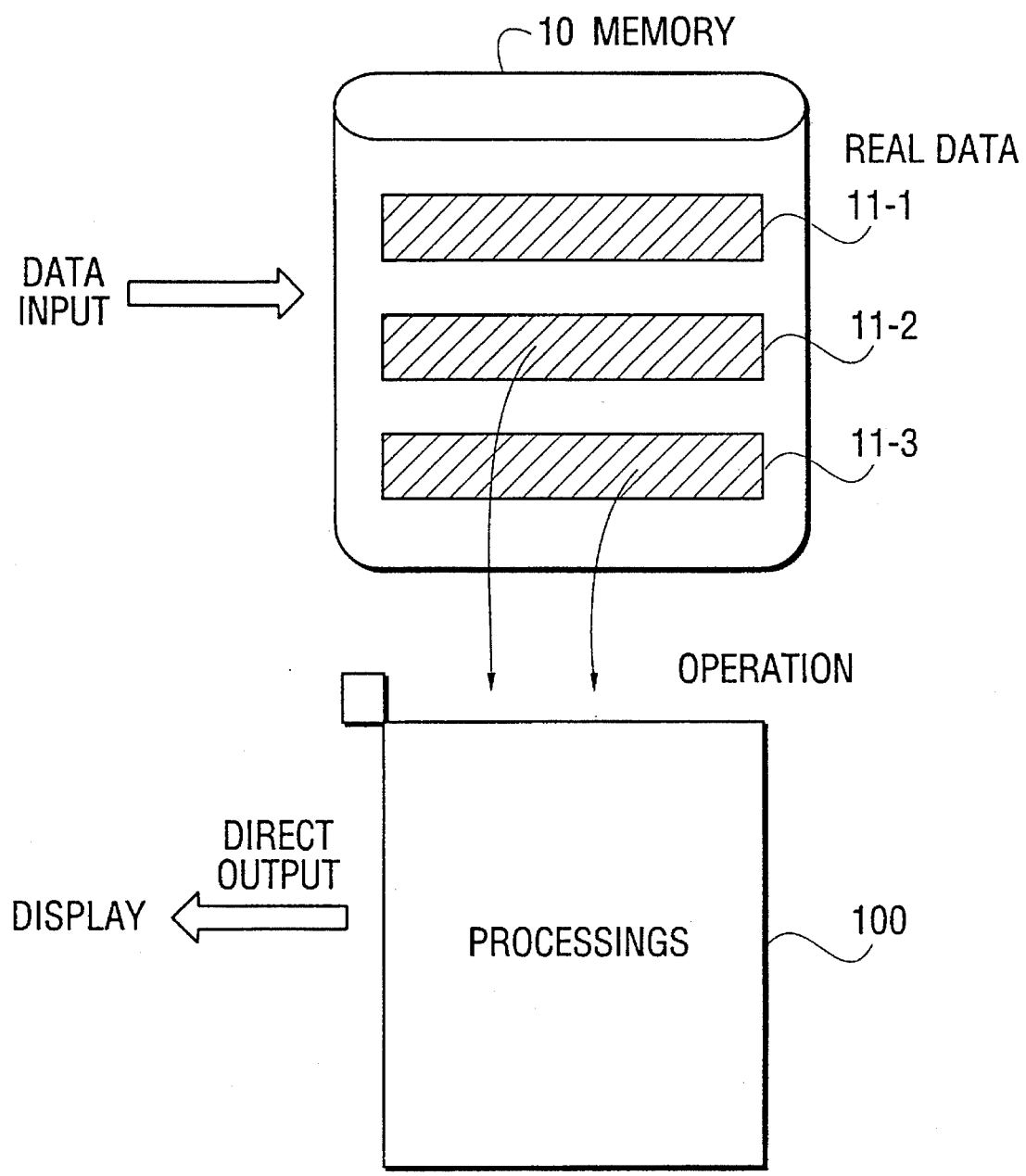
FIG. 16 is an example of the prior art for processing data by a computer.
Figure 17:
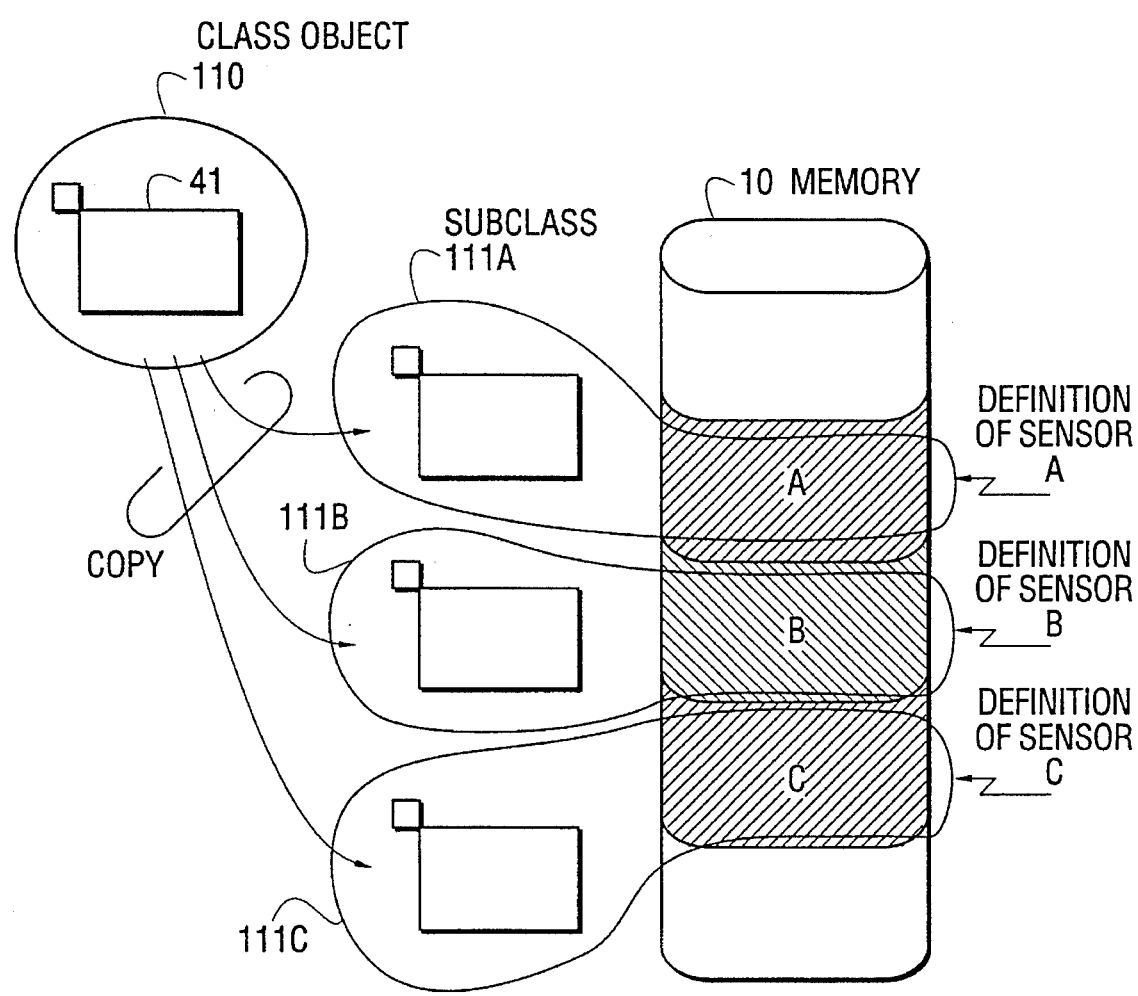
FIG. 17 is an example of the object-oriented processing structure of the prior art.

FIG. 15 indicates an example of execution of data processing by this command. In this figure, the reference numeral 65 denotes a terminal output file which controls multi-media information which is output as the one significant information. The command "G10" indicated in this figure indicates the command for simultaneously outputting the command C05 and command V03 explained in regard to FIG. 14.

In FIG. 15, when an execution request is issued from a display unit of the input/output unit 20, the terminal output file 65 sends both command C05 corresponding to the command G10 and the command V03 to the input/output table processing object 60. This input/output table processing object 60, upon reception of these two commands, determines the storing address of the file 61 corresponding to to the command C05 in accordance with the realization table 16 and also decides the storing address of the file 61 corresponding to the command V03.

With these storing addresses, the data "aaa" corresponding to the command C05 and the data "bbb" corresponding to the command V03 are read from the file 61. The input/output table processing object 60 outputs such data "aaa" to the display unit of the input/output unit 20 and also outputs the data "bbb" to the microphone of the input/output unit 20 in order to execute the processing of the command G10.

As explained, when it is required to output the part data corresponding to the command on the occasion of executing data processing in accordance with the command, the corresponding part data is read from the file 61. Thereby, part data may be output at a high speed.

APPLICABILITY IN INDUSTRY

With diversification of application mode of data processing system such as interrelationship of multi-media, realization of high level user interface, distributed processing and distributed data base, high level functions are required. Accordingly, the development steps of system tends to increase and it recently becomes more important to realize development technique of the data processing system which ensures productivity, reliability and flexibility.

According to the present invention, an effective and flexible system can be structured by using the real data designated in the memory and the method for operating it as the parts and dealing these data with a short command and thereby the system for readily realizing processing and distributed processing of multi-media. Particularly, since the object is formed by dynamically selecting the method for the significant real data to capsulate it, uneffective program is no longer necessary and the processing means just suitable for the terminal unit having a small memory capacity can be structured.

What is claimed is:

1. A processor for processing real data in a memory with a computer, comprising:

a part file for storing data and a method of processing said data which are used as parts forming an object;

part registration means defining a command for identifying said parts and storing said command and attribute information thereof in said part file;

a realization table indicating correspondence between said command and a storing region of said data;

processing means for processing said command as data, in place of processing said data and binding said data to method at a time said command is identified; and input/output means for obtaining said data for said command with reference to said realization table, at a time that display of said data is necessary.

2. A processor according to claim 1, further comprising:

a memory storing said data through classification in accordance with an application or a kind of function; and a file management table storing an assignment for and used for controlling assignment of a region of said memory for each application or kind of function and storing an assignment for and used for controlling the storing of said command for each application or kind of function.

3. An object process for an object in a system for processing data with a computer, comprising the steps of:

defining a command, which identifies an instance object including said data and a method of processing said data together forming said object;

storing said data and said method as parts in a parts file and storing said command and attribute information corresponding to said parts in said parts file;

dynamically binding said data and said method as indicated by said command at the time of receipt of a message including said command and thereby forming said object at the time said command is received; and processing said object using a pair of said command and said data.

4. An object processing method according to claim 1, wherein:

a method commonly used for plural objects with a same attribute is previously stored in said computer for said objects with said same attribute; and said previously stored method is stored with said command and attribute information in said parts file.

5. A method of performing object oriented processing, comprising:

assigning data to an object;

dynamically binding an existing object process to said object responsive to a command identifying said data and said process at a time said command is identified; and performing a function defined by said command using said data and said process.

6. A method of performing object oriented processing, comprising:

storing data for an object in a parts file;

storing a process for processing said data in said pares file;

dynamically binding said data and said process to create an object responsive to an object command designating said object at a time the command is identified and a function to be performed by said object; and executing said object to perform said function on said data.

7. An object oriented processing system, comprising:

a memory storing data and a process for processing said data as parts in a parts file;

a computer coupled to said memory and accessing said memory responsive to an object command identifying said data and said process, retrieving said data and said process, dynamically binding said data and said process at a time said command is identified, and executing said process.

* * * * *

UNITED STATES PATENT AND TRADEMARK OFFICE
CERTIFICATE OF CORRECTION

PATENT NO. : 5,479,614
DATED : December 26, 1995
INVENTOR(S) : Aoe et al.

Page 1 of 2

It is certified that error appears in the above-indentified patent and that said Letters Patent is hereby corrected as shown below:

```
Title Page, Under "[30] Foreign Application Priority
Date" insert the following line:
--Sept. 11, 1990    PCT    PCT/JP90/01160--;
Title Page, Under "[57] Abstract",
      line 4, "(1-1...)" should be --(1-1,...)--;
      line 7, "(2-2...)" should be --(2-2,...)--;
Column 1, line 14, after "by" insert --a--;
   Column 1, line 37, delete "in direct";
Column 1, line 58, "field ," should be --field,--;
Column 1, line 58, "insufficiently" should be
      --inefficiently--;
Column 4, line 20, "of" should be --at--;
   Column 6, line 64, delete "on the occasion of";
```

UNITED STATES PATENT AND TRADEMARK OFFICE
CERTIFICATE OF CORRECTION

PATENT NO. : 5,479,614
DATED : December 26, 1995
INVENTOR(S) : Aoe et al.

It is certified that error appears in the above-indentified patent and that said Letters Patent is hereby corrected as shown below:

Column 8, line 1, after "region" insert --,--;
  Column 14, line 16, delete "to" (first occurrence);
Column 16, line 15, "pares" should be --parts--;

Signed and Sealed this

Tenth Day of September, 1996

BRUCE LEHMAN

*Attest:*

*Attesting Officer*     *Commissioner of Patents and Trademarks*